3,560,571
NOVEL PHOTOCHEMICAL REACTION OF 4-
CARANONE AND NOVEL REACTION PROD-
UCTS RESULTING THEREFROM
Paul J. Kropp, Springfield Township, Hamilton County,
Ohio, assignor to The Procter & Gamble Company,
Cincinnati, Ohio, a corporation of Ohio
No Drawing. Filed May 29, 1967, Ser. No. 642,235
Int. Cl. C07c 49/27, 49/28
U.S. Cl. 260—586    6 Claims

ABSTRACT OF THE DISCLOSURE

Photochemical reaction of 4-caranone to obtain the novel compounds, 2-(2'-methyl-2'-but-3'-enyl) - 4 - methylcyclobutanone and 2,2,5-trimethyl - 3 - vinylcyclopentanone, and the process of converting 3-carene to 4-caranone by epoxidizing 3-carene and, subsequently, treating that product with a Lewis acid catalyst.

FIELD OF THE INVENTION

This invention relates to a novel process for obtaining 4-caranone from 3-carene, a novel photochemical reaction of 4-caranone and the novel ketone compounds formed from this reaction. More specifically, it has been discovered that 4-caranone, on irradiation with ultraviolet light, rearranges to form the novel compounds 2-(2'-methyl - 2'-but-3'-enyl)-4-methylcyclobutanone and 2,2,5-trimethyl - 3 - vinylcyclopentanone. It has further been discovered that 4-caranone can be obtained from readily available 3-carene by epoxidizing 3-carene to obtain 3,4-epoxycarane and, subsequently, treating the epoxycarane with a Lewis acid catalyst to obtain 4-caranone.

PRIOR ART 4-caranone, which is the starting material for the photochemical process of the present invention, can be derived from the well known and naturally occurring compound, 3-carene, and can be prepared by a number of well known and conventional techniques.

For example, 4-caranone can be prepared from 3-carene by hydroboration with oxidative workup to give 4-caranol as described by Kuczynski and Piatkowski Roczniki Chem., vol. 34, page 1189 (1960); Cocker, Shannon and Staniland, J. Chem. Soc. (c), page 485 (1967); and H. C. Brown and G. Zweifel, J. Am. Chem. Soc., vol. 89, page 561 (1967). Oxidation of the 4-caranol to give 4-caranone can be carried out by any of a large variety of methods; for example, those described by Cocker, Shannon and Staniland, supra, or by Gollnick, Schroeter, Ohloff, Schade and Schenck, Ann., vol. 687, page 14 (1965).

Another method of preparing 4-caranone comprises the steps of epoxidizing 3-carene to form the 3,4-epoxycarane, as described by Arbuzov and Mikhailov, J. prakt. Chem., vol. 127, page 1 (1930), and, subsequently, rearranging the epoxycarane to form 4-caranone. This rearrangement of 3,4-epoxycarane can be accomplished in the presence of (1) sodium metal, see Kuczynski and Chadbudzinski, Roczniki Chem., vol. 29, page 437 (1955) and Roczniki Chem., vol. 34, page 177 (1960); (2) sulfuric acid and tertiary butyl alcohol, see Kuczynski and Hendrich, Roczniki Chem., vol. 33, page 293 (1959) and Isaeva and Andreeva, Dokl. Akad. Nauk SSSR, vol. 152, page 106 (1963); (3) acetic anhydride, see Arbuzov, Isaeva and Povodyreva, Dokl. Akad. Nauk SSSR, vol. 195(4), page 827 (1964); or (4) acetic acid, see Chadbudzinski and Kuczynski, Roczniki Chem., vol. 33, page 871 (1959).

It is also known that the internal cyclopropyl bond of bicyclic β,γ-cyclopropyl ketones can be broken by photochemical reaction. See Starr and Eastman, J. Org. Chem., vol 31, page 1393 (1966) and Eastman, Starr, St. Martin and Sakata, ibid, vol. 28, page 2162 (1963). The compounds, when irradiated, also undergo a decarbonylation reaction. See Starr et al., supra and Eastman et al., supra. Other cyclic ketones, when irradiated, are isomerized to the corresponding ketenes or aldehydes. See Srinivasan and Cremer, J. Am. Chem. Soc., vol. 87, page 1647 (1965); and Srinivasan, ibid, vol. 81, page 2601 (1959).

SUMMARY OF THE INVENTION

An object of this invention is to provide novel photochemical reactions of 4-caranone. It is a further object of this invention to provide novel odoriferous compounds, 2 - (2'-methyl-2'-but-3'-enyl)-4-methylcyclobutanone and 2,2,5-trimethyl-3-vinylcyclopentanone. Another object of this invention is to provide a novel process for preparing 4-caranone from 3-carene.

The above and other objects are achieved by a novel process comprising the steps of:

(1) Treating 3-carene having the general formula

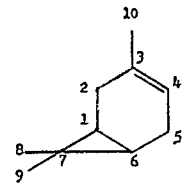

with a peracid having the structural formula, RCO₃H, wherein R is any alkyl group containing from 1 to 20 carbon atoms or any aryl group containing from 6 to 18 carbon atoms to obtain 3,4-epoxycarane having the general formula

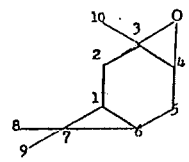

(2) Treating said 3,4-epoxycarane with a Lewis acid catalyst to obtain 4-caranone having the general formula

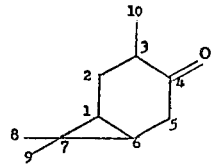

(3) Subjecting 4-caranone, which is obtained by the above method or by any of the hereinbefore described conventional techniques, to ultraviolet irradiation to form a mixture of 2-(2'-methyl-2'-but-3'-enyl)-4-methylcyclobutanone having the general formula

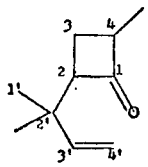

and 2,2,5 - trimethyl - 3 - vinylcyclopentanone having the general formula

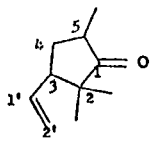

The 2 - (2' - methyl - 2' - but - 3' - enyl) - 4 - methylcyclobutanone and 2,2,5 - trimethyl - 3 - vinylcyclopentanone compounds and 4-caranone have desirable odor characteristics and thus have utility in the perfume arts, particularly as components of perfume compositions.

DESCRIPTION OF THE PRODUCTS AND PROCESS

The term ultraviolet irradiation is used generically herein and in the appended claims to define both irradiation in the presence of a photosensitizer (photosensitized) and irradiation in the absence of a photosensitizer (nonphoto sensitized). Some of the solvents utilized herein may serve a dual role as solvent and photosensitizer, e.g., the aromatic hydrocarbons discussed hereinafter.

A novel and particularly preferred method of obtaining 4-caranone from 3-carene has not been discussed in the prior art. This method comprises the heretofore documented step of treating 3-carene (either optical antipode thereof can be used) with a peracid, see Arbuzov and Mikhailov, supra, and the novel step of, subsequently, treating that reaction product with a Lewis acid. Peracids having the following generic formula can be utilized in this process:

$$ROC_3H$$

wherein R is any alkyl group containing from 1 to about 20 carbon atoms or any aryl group containing from about 6 to about 18 carbon atoms. Examples of suitable peracids include meta-chloroperbenzoic acid, perbenzoic acid, para-nitroperbenzoic acid, peracetic acid and monoperphthalic acid. The 3-carene and the peracid are mixed with a nonreactive solvent, e.g., diethyl ether, methylene chloride, chloroform or benzene, and allowed to react. The reaction product is 3,4-epoxycarane in nearly quantitative yields. Excess acid is extracted from this mixture with base and the epoxycarane is distilled from the resultant mixture.

The 3,4-epoxycarane is subsequently treated with a Lewis acid catalyst and, thus, rearranged to form 4-caranone. Any Lewis acid may be used in this process. Examples of these Lewis acids are boron trifluoride, titaniumtetrachloride, aluminum trichloride, ferric trichloride, zinc dichloride and stannic tetrachloride. The preferred Lewis acid is boron trifluoride, more preferably in th form of its etherate; as it is both readily available and easily handled. The Lewis acid is mixed with a solvent and then added to the 3,4-epoxycarane. The solvent can be any ether such as dimethyl ether, methyl ethyl ether, diethyl ether, dipropyl ether, dibutyl ether, monoglyme (1,2-methoxyethane) or diglyme[bis-(2-methoxyethyl)ether], or the solvent can be, for example, benzene or chloroform. The reaction will take place at room temperature, e.g., 25–40° C., by merely mixing the Lewis acid-solvent mixture with the epoxycarane. If it is desired to increase the rate of the reaction, the Lewis acid can be refluxed with the epoxycarane.

This reaction yields two products, 4-caranone (about 43% of the reaction product) and para-menth-3-en-2-one (about 28% of the reaction product). The structural formula for para-menth-3-en-2-one is

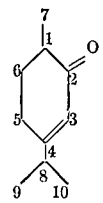

The remainder of the reaction mixture is comprised of a low boiling fraction which can easily be distilled from the mixture and a high boiling fraction. The exact composition of these fractions is unknown.

These reaction products, 4-caranone and para-menth-3-en-2-one, have desirable odor characteristics and are particularly valuable as perfume components. These reaction products can be separated by distillation from each other and used individually as perfume components or the reaction product, i.e., the mixture of the above two components, can be used as a perfume component. 4-caronone has a desirable odor that is generally characterized as an herbal note reminiscent of sage, calamus and carvone, while para-menth-3-en-2-one has a desirable odor that is characterized as a minty note reminiscent of carvone with a sweet cresol background. The mixture of these two components obtained from the above reaction has an odor characterized as sage with a green vegetable note. Perfume compositions containing odoriferously effective amounts, e.g., 0.0001% to about 50%, of these compounds are useful and desirable.

In the novel photochemical reaction of this invention, it is desirable to use, as a starting material, only 4-caranone. The 4-caranone can easily be distilled from the mixture of products obtained from the above-described reaction.

4-caranone, i.e, both of the 10-methyl epimers and the optical antipodes thereof, when subjected to ultraviolet irradiation, rearranges to form 2-(2'-methyl-2'-but-3' - enyl)-4-methylcyclobutanone and 2,2,5-trimethyl-3-vinylcyclopentanone.

When carrying out the irradiation of 4-caranone to form 2 - (2' - methyl - 2' - but - 3' - enyl) - 4 - methylcyclobutanone and 2,2,5 - trimethyl - 3 - vinylcyclopentanone any conveniet source of ultraviolet radiation can be used, i.e., a light source that emits photo energy at wavelengths distributed throughout the range of from about 200 mμ to about 400 mμ. The wavelength of irradiation is preferably concentrated within the maximum absorption spectrum of the starting material, i.e., at wavelengths distributed throughout the range of from about 250 mμ to about 320 mμ.

Commercially available high-pressure mercury arc lamps, i.e., lamps having a total power capacity ranging from about 50 watts to about 10,000 watts, preferably from about 100 watts to about 600 watts, have the above-described spectral characteristics and are particularly useful sources of ultraviolet radiation for use herein. Also useful in this invention are the commercially available low-pressure mercury lamps. These lamps have a total power capacity ranging from about 0.5 watt to about 50 watts, preferably from about 0.5 watt to about 2 watts, and emit essentially monochromatic light. These lamps generally emit wavelengths of 253.7 mμ but, with the addition of suitable phosphors, can emit wavelengths of 300 mμ and 355 mμ, for example.

The reaction vessels used in the irradiation of 4-caranone are not particularly critical. Quartz, Vycor, Corex or Pyrex reaction vessels can be used herein. Pyrex reaction vessels, however, should not be used when low-pressure mercury lamps emitting wavelengths less than 280 m$\mu$ are utilized as Pyrex tends to filter out wavelengths below 280 m$\mu$. Quartz and Vycor reaction vessels are preferred for use in this photochemical reaction.

Preferably, a solvent is used as a medium for the irradiation reaction. Desirable solvents are those which dissolve the starting material, 4-caranone, and the products of irradiation, 2-(2'-methyl-2'-but-3'-enyl)-4-methylcyclobutanone and 2,2,5-trimethyl-3-vinylcyclopentanone, to form a homogeneous system but which are otherwise inert and do not substantially interfere with the transmission of the radiation.

Alcohols constitute a class of solvents suitable for use in this invention. Examples of suitable alcohol solvents include aliphatic monohydric alcohols containing from about 1 to about 10 carbon atoms such as methanol, ethanol, t-butyl alcohol, and the like, and aliphatic dihydric alcohols containing from about 2 to about 10 carbon atoms, such as ethylene glycol or propylene glycol. t-Butyl alcohol represents an especially preferred alcohol solvent.

Saturated hydrocarbons constitute a class of preferred solvents. Examples of such saturated hydrocarbon solvents include the alkanes, preferably of from 5 to 12 carbon atoms, such as hexane, octane, dodecane and the like: and the cyclic alkanes, preferably of from about 5 to 10 carbon atoms such as cyclopentane, cyclohexane, cyclooctane and the like. Hexane and cyclohexane represent especially preferred saturated hydrocarbon solvents.

Ethers constitute another class of preferred solvents for use in this photochemical reaction. Examples of suitable ether solvents include cyclic monooxy ethers, such as tetrahydrofuran, cyclic dioxy ethers such as dioxane, aliphatic monooxy ethers such as diethyl ether and aliphatic dioxy ethers such as ethylene glycol dimethyl ether or diethylene glycol dimethyl ether. All of the ether solvents preferably contain from about 4 to about 10 carbon atoms.

Another particularly preferred class of solvents for use in this invention is the aromatic hydrocarbons containing from about 6 to about 18 carbon atoms such as benzene, toluene and xylene.

The above solvents can be utilized separately in this invention or they can be used in admixture in any proportions.

Preferably, the concentration of 4-caranone in the reaction medium, i.e., the solvent, ranges from about 0.001 M to about 2 M, more preferably from about 0.01 M to about 0.5 M.

The irradiation is primarily photochemical rather than thermal in nature; thus the temperature employed can vary widely, e.g., from about −40° C. to about 100° C. A preferred temperature range for the reaction is from about 20° C. to about 35° C. Because of the energy loss in the form of heat from the mercury lamps, some sort of cooling device, e.g., a water bath, is generally utilized to maintain the temperature of the reaction components in the desired temperature range.

It is preferable to carry out the irradiation reaction in an inert atmosphere such as nitrogen, argon, etc., to prevent quenching, oxidation, contamination and the like. To insure the uniform irradiation of the starting material, it is also preferable to agitate the reactants. This can easily be accomplished by bubbling the inert gas through the reaction medium during irradiation.

The time required for the irradiation of 4-caranone to reach completion, i.e., when the novel ketone compounds have been formed, is generally between about 5 minutes and 60 hours, usually between about 30 minutes and about 4 hours. The reaction time varies with the concentration of the starting material in the solvent, the solvent, the intensity of the radiation source, the physical reaction conditions and the absorption of the irradiation by the reaction vessel. However, the course of the reaction can readily be followed by conventional techniques, e.g., by observing the infrared absorption spectrum of the system, or by gas chromatography. It is highly preferable to stop the reaction when the maximum yield of product is obtained since further irradiation subsequent to this time may result in the formation of undesirable secondary products.

The novel ketone reaction products are formed in a weight ratio of 2,2,5-trimethyl-3-vinylcyclopentanone to 2 - (2' - methyl-2'-but-3'-enyl)-4-methylcyclobutanone of from about 1:1 to about 3:1 and, generally, in a ratio of about 1.5:1. The novel ketone products are preferably separated from the reaction mixture. This separation can readily be accomplished by distillation. The mixture of the novel ketones, after distillation, contains essentially no contaminants or foreign materials.

The mixture of novel ketones obtained from the above distillation step is difficult to separate into its components by usual and conventional separation techniques, e.g., distillation, extraction, etc. If separation is desired, the mixture of novel ketones can be reduced to the corresponding alcohols with lithium aluminum hydride. The alcohols can readily be separated by preparative gas chromatography and the original products can be obtained, in separated and relatively pure form, by separately oxidizing each of the alcohols so obtained. For oxidation methods suitable for this use see Bowden, Heilbron, Jones, and Weedon, J. Chem. Soc., page 39 (1946), or Poos, Arth, Beyler and Sarett, J. Am. Chem. Soc., vol. 75, page 422 (1953).

The novel ketone compounds prepared by the photochemical reaction of this invention both have highly desirable and useful odors. The odor of the mixture of the two novel ketones is characterized as a camphoraceous note being somewhat dry and minty.

The above ketones can be used individually or in admixture with each other as odorants per se or as components of perfume compositions for ultimate use in products such as soaps, detergents, deodorants and the like. Perfume compositions containing odoriferously effective amounts, e.g., 0.0001% to about 50%, of either of the above-described ketones or mixtures of these ketones are desirable and useful. More specific illustrations of the perfume utility of these compounds are found in Examples IV to VI hereinafter.

EXAMPLES

The following examples illustrate specific preferred embodiments of this invention and are not intended to be limiting. All percentages and ratios in the following examples, as well as in this specification and in the appended claims, are by weight unless otherwise indicated. Temperatures are expressed in degrees centigrade.

Data listed in all of the examples were obtained by means of the following techniques unless otherwise indicated. Optical rotations were measured in absolute ethanol, and infrared spectra were obtained on neat samples with a Perkin-Elmer Infracord spectrophotometer. Gas chromatographic analyses were performed on an Aerograph model 202B instrument using 10-ft. x 0.25-in. columns packed with (A) 20% Carbowax 20M (a conventional polyester column packing) on 60/80-mesh firebrick or 20% diethylene glycol succinate on 60/80-mesh Chromosorb W. Nuclear magnetic resonance (n.m.r.) spectra were determined in deuterated chloroform solution with a Varian model HA–100 spectrometer, using tetramethylsilane as an internal standard. The n.m.r. data are noted by multiplicity (s.=singlet, d.=doublet, t.=triplet, q.=quartet and m.=unresolved multiplet), integration, coupling constant (in Hz.), and assignment. Mass spectra were obtained using an Atlas CH–4 or an Atlas SM–1 spectrometer.

All irradiations, unless otherwise indicated, were performed in a conventional photochemical reaction flask equipped with a nitrogen flush and a Vycor immersion well. Nitrogen was bubbled through the reaction mixtures and the temperature was maintained in the range of 20° to 35° C. by means of a water jacket.

The light sources used in the following examples were commercially available mercury lamps. More specific data on the lamps used are tabulated as follows:

Results substantially similar to the above results are obtained in that 3-carene is converted to 3,4-epoxycarane when the following peracids are substituted for meta-chloroperbenzoic acid: perbenzoic acid, para-nitroperbenzoic acid, peracetic acid and mono-perphthalic acid. When the following Lewis acids are utilized in place of boron trifluoride in the above reaction, substantially the same results are obtained: titanium tetrachloride, alumi-

|  | Radiation source | | | |
|---|---|---|---|---|
|  | Hanovia L-679A [1] (high pressure) | Hanovia S-654A [1] (high pressure) | Rayonet RPR-3500A [2] (low pressure) | Rayonet RPR-2537A [2] (low pressure) |
| Total power capacity (watts) | 450 | 200 | | |
| Ultraviolet spectral characteristics (watts): | | | | |
| 200 mμ–250 mμ | 14.0 | 0.7 | 0 | |
| 250 mμ–300 mμ | 21.3 | 3.2 | 0 | ([3]) |
| 300 mμ–400 mμ | 48.4 | 6.6 | 23.5 | |
| Total radiated energy | 175.8 | 25.5 | 24 | |

[1] Obtained from Hanovia Lamp Division, Englehard Industries. For further details, see specification sheet EH-223, 5-1-59, Englehard Industries.
[2] A circular array of 16 lamps as obtained from Southern New England Ultraviolet Company. For further details see catalog No. RPR-100, Southern New England Ultraviolet Company.
[3] 35 watts at 253.7 mμ.

EXAMPLE I

Preparation of 4-caranone from 3-carene

A solution containing 13.8 grams of 3-carene and 20.4 grams of meta-chloroperbenzoic acid dissolved in 150 ml. of diethyl ether was stirred at 25° C. for 4 hours. The 3-carene and the meta-chloroperbenzoic acid reacted to form 3,4-epoxycarane which was distilled from the reaction mixture in yields of nearly 100% after extraction with 5% sodium hydroxide solution. One gram of 3,4-epoxycarane, prepared as described above, and 4 drops of boron trifluoride etherate in 20 ml. of diethyl ether were added to a reaction flask. The mixture was heated under reflux at about 35° C. in an atmosphere of nitrogen for 45 minutes. The resulting solution was diluted with 150 ml. of ether and was washed with three 50-ml. portions of water. The combined ether extracts were dried over two 50-ml. portions of saturated sodium chloride and then dried with anhydrous sodium sulfate. The solvent was removed by distillation. The solute was a pale yellow oil which was separated by gas chromatography into three major components, these components being present in yields of 14%, 43% and 28%.

The component which comprised 14% of the solute was a low boiling fraction. It had a retention time characteristic of $C_{10}$ aromatic hydrocarbons and was not further investigated.

The component which comprised 43% of the solute was purified by short-path distillation at a temperature of 82–83° C. and an absolute pressure of 5 mm. of mercury. The product obtained was a colorless liquid, 4-caranone, having the following analytical characteristics: $[\alpha]_D^{25}$ —120° (c, 1.50); $\lambda_{max}$ 5.82μ; n.m.r. spectrum: $\tau$8.97 and 9.16 (2 s, 6, $CH_3$-9 and –8 and 905 (d., J=6.0 Hz., $CH_3$-10). The infrared spectrum was similar to that published by Ohloff, Farnow and Philipp, Ann., vol. 613 at page 43 (1958) for a similar mixture obtained by ozonization of (—)-$\Delta^{4,a}$-caranemethanol acetate. The odor of 4-caranone was characterized as a herbal note reminiscent of sage, calamus and carvone.

The component which comprised 28% of the solute was purified by short-path distillation at a temperature of 88° C. and an absolute pressure of 3 mm. of mercury. The product obtained was a colorless liquid, para-menth-3-en-2-one having the following analytical characteristics: $[\alpha]_D^{25}$ —6° (c., 1.88); $\lambda_{max}$ 6.00 and 6.16μ; $\lambda_{max}$ 233 mμ ($\epsilon$ 14,000); n.m.r. spectrum: $\tau$4.18 (s., 1, CH–3), 8.87 (d., J=6.0 Hz., $CH_3$–7), and 8.93 (d., J=6.0 Hz., $CH_3$–8 and –9). The odor of para-menth-3-en-2-one was characterized as a minty note reminiscent of carvone with a sweet cresol background.

num trichloride, ferric trichloride, zinc dichloride and stannic tetrachloride. The following solvents can be substituted for diethyl ether to obtain results substantially similar to the above results: dimethyl ether, methyl ethyl ether, dipropyl ether, dibutyl ether, monoglyme, diglyme, benzene and chloroform.

EXAMPLE II

Irradiation of 4-caranone

A solution containing 5.01 grams of 4-caranone in 150 ml. of benzene (0.22 molar) was placed in the conventional photochemical reaction flask hereinbefore described. The solution was continuously flushed with a stream of nitrogen and was irradiated for 2.25 hours with a Hanovia S–654A, 200 watt, high-pressure mercury arc lamp.

After the irradiation period, the benzene was removed by distillation at atmospheric pressure. The residue was distilled on a 12-inch spinning band column at a temperature of 75–80° C. and an absolute pressure of 9.5 mm. of mercury. A total of 2.62 grams (52%) of a colorless liquid was obtained which was shown by gas chromatography to consist solely of the two novel ketones of this invention, 2-(2′-methyl-2′-but-3′-enyl)-4-methylcyclobutanone and 2,2,5-trimethyl-3-vinylcyclopentanone. The weight ratio of the cyclopentanone to the cyclobutanone was 1.5:1. The mixture of ketones was obtained as a colorless liquid after purification by preparative gas chromatography followed by a short-path distillation at 50° C. and 0.6 mm. of mercury. The mixture had the following analytical characteristics: $\lambda_{max}$ 3.17, 5.62, 5.74 and 6.10μ; n.m.r. spectrum: $\tau$4.0–4.4 (m., 1, vinyl CH) and 4.8–5.0 (m., 2, vinyl $CH_2$).

Analysis.—Calculated for $C_{10}H_{16}O$ (percent): C, 78.89, H, 10.59. Found (percent): C, 78.79; H, 10.77.

The mixture of ketones was separated by the following procedure: 5.66 grams of the mixture of ketones above described in 20 ml. of anhydrous diethyl ether was added dropwise over a period of one-half hour to a stirred mixture of 1.10 grams of lithium aluminum hydride in 50 ml. of anhydrous diethyl ether. The resulting mixture was heated under reflux for 1.5 hours, cooled, and 4.4 ml. of water was added dropwise. After stirring for an additional half hour, the inorganic solids were removed by vacuum filtration and washed with four 50-ml. portions of diethyl ether. The combined ether solutions were distilled to yield 5.64 grams (98%) of a clear liquid which had a boiling point of 52–54° C. at a pressure of 0.8 mm. mercury. The distillate was shown by gas chromatography to consist of three major components.

Isolation of the first peak by gas chromatography followed by short-path distillation at a temperature of 60–

62° C. and a pressure of 1.5 mm. mercury gave one epimer of 2-(2'-methyl-2'-but-3'-enyl) - 4 - methylcyclobutanol as a colorless liquid. This epimer had the following analytical characteristics: $[\alpha]_D^{27}$ —17° (c., 1.29); $\lambda_{max}$ 2.82, 3.23 and 6.11μ; n.m.r. spectrum: τ3.87 (q., 1, J=11 and 18 Hz., CH–3'), 5.00 (m., 2, CH–4'), 5.64 (m., 1, CH–1), 8.91 and 9.01 (2 s., 6, 2CH$_3$–2') and 9.05 (d., 3, J=6 Hz., CH$_3$–4).

*Analysis.*—Calculated for $C_{10}H_{18}O$ (percent): C, 77.86; H, 11.76. Found (percent): C, 77.64; H, 11.81.

Gas chromatographic separation of the second peak followed by short-path distillation at a temperature of 69–71° C. and a pressure of 2.1 mm. of mercury gave a second epimer of 2-(2'-methyl-2'-but-3'-enyl)-4-methylcyclobutanol as a colorless oil. This epimer had the following analytical characteristics: $[\alpha]_D^{27}$ —32° (c., 1.54); $\lambda_{max}$ 2.88, 3.21 and 6.11μ; n.m.r. spectrum: τ3.86 (q., 1, J=10.5 and 17.5 Hz., CH–3'), 495 (m, 2, CH$_2$–4'), 6.05 (t., 1, J=7.3 Hz., CH–1), 8.84 and 8.93 (2 s., 6, 2CH$_3$–2') and ~9.0 (d., obscured by the two 2' methyls, CH$_3$–1).

*Analysis.*—Calculated for $C_{10}H_{18}O$ (percent): C, 77.86; H, 11.76. Found (percent): C, 77.78; H, 11.68.

Purification of the last peak by gas chromatagraphy followed by short-path distillation at a temperature of 73° C. and a pressure of 2.1 mm. of mercury gave the 2,2,5-trimethyl-3-vinylcyclopentanol as a colorless liquid. This fraction had the following analytical characteristics: 1, J=10 and J=18 Hz, CH—3') ~5.0 (m., 2, CH$_2$—4), 8.75 (d, 3, J= 7 Hz., CH$_3$—4), and 8.82 and 8.86 (2 s., 6, 2CH$_3$-2').

Oxidation of the third alcohol fraction by the above procedure, followed by purification, first, by gas chromatography, and then short-path distillation at a temperature of 68° C. and a pressure of 6.0 mm. of mercury gave the 2,2,5-trimethyl-3-vinylcyclopentanone as a colorless liquid. The cyclopentanone had the following analytical characteristics: $[\alpha]_D^{25}$+36° (c., 1.48); $\lambda_{max}$ 3.23, 5.74 and 6.11μ; n.m.r. spectrum: τ4.26 (m., 1, CH—1'), 4.89 (m., 2, CH$_2$—2'), 8.91 (d., 3, J=8 Hz., CH$_3$—5), 9.00 and 9.18 (2 s., 6, 2CH$_3$—2).

Both ketones had odors which make them desirable for perfume components. The mixture of ketones is especially desirable for use in perfume formulations. Its odor is characterized as a camphoraceous note being somewhat dry and minty.

EXAMPLE III

Irradiation of 4-caranone 4-caranone was irradiated in accordance with the process of Example II. The solvents, light sources, time required for the reaction and materials comprising the reaction flask were varied as set forth in Table I below. In all cases, 1 gram of 4-caranone was dissolved in 150 ml. of solvent.

| | | | | After 1 hour of irradiation | | After 2 hours of irradiation | |
|---|---|---|---|---|---|---|---|
| | Reaction flask material | Solvent | Ultraviolet light source | Percent photo-products [1] | Percent 4-caranone | Percent photo-products | Percent 4-caranone |
| Run: | | | | | | | |
| 1 | Vycor | Benzene | 200 watt [2] | 53 | 16 | | |
| 2 | do | Hexane | 200 watt | 43 | 17 | | |
| 3 | do | Acetone | 200 watt | 9 | 85 | 22 | 65 |
| 4 | do | Acetone/benzene | 200 watt | 21 | 70 | 32 | 50 |
| 5 | do | Hexane/t-butylamine | 200 watt | 38 | 13 | | |
| 6 | Quartz | Benzene | 2,537 A. [3] | 26 | 62 | 43 | 36 |
| 7 | do | Hexane | 2,537 A. | 34 | 53 | 46 | 27 |
| 8 | do | t-Butyl alcohol | 2,537 A. | 19 | 60 | 29 | |
| 9 | Pyrex | Benzene | 3,500 A. [4] | [5] 17 | 74 | | |

[1] 2-(2'-methyl-2'-but-3'-enyl)-4-methylcyclobutanone and 2,2,5-trimethyl-3-vinylcyclopentanone.
[2] 200 watt Hanovia S–654A lamp.
[3] Rayonet RPR 3,537 A. lamp (circular array of 16 lamps).
[4] Rayonet RPR 3,500 A. lamp (circular array of 16 lamps.)
[5] Irradiation time was 10 hours.

$[\alpha]_D^{27}$ —23° (c., 1.28); $\lambda_{max}$ 2.94, 3.23 and 6.11μ; n.m.r. spectrum: τ4.28 (m., 1, CH–1'), 5.07 (m., 2, CH$_2$–2'), 6.88 (d., 1, J=8 Hz., CH–1), 8.90 (d., 3, J=6 Hz., CH$_3$–5), and 9.05 and 9.30 (2 s., 6, 2CH$_3$–2).

*Analysis.*—Calculated for $C_{10}H_{18}O$ (percent): C, 77.86; H, 11.76. Found (percent): C, 77.56; H, 11.81.

Oxidation of the alcohols was carried out in each case by dissolving the alcohol in twenty times its weight of acetone and cooling the solution to 0° C. One mole equivalent of four normal chromic acid solution prepared according to the method described in Bowden, Heilbron, Jones and Weidon, *supra*, was added dropwise to the alcohol solution. The resulting solution was diluted by one-half on a weight percent basis with diethyl ether and dried over anhydrous magnesium sulfate. The solvent was removed at atmospheric pressure leaving a colorless liquid.

Oxidation of the first cyclobutanol according to the above procedure and purification of the resulting product by gas chromatography yielded a colorless liquid. The cyclobutanone had the following analytical characteristics: $[\alpha]_D^{25}$+97° (c, 1.65); $\lambda_{max}$ 5.62 and 6.10μ; n.m.r. spectrum: τ~4.2 (q., 1, J=10 and 17 Hz., CH—3'), ~5.0 (m., 2, CH$_2$—4'), 8.81 (d., 3, CH$_3$—5), and 8.84 and 8.86 (2 s., 6, 2CH$_3$—2'); mass spectrum: 152, 137, 124, 110, 95, 83, 82.

Oxidation of the second cyclobutanol in a similar fashion followed by purification by gas chromatography yielded a cyclobutanone which had the following analytical characteristics: $\lambda_{max}$ 5.62μ; n.m.r. spectrum: τ~4.2 (q., Some of the 4-caranone may react to form unwanted photo reaction by-products which are believed to be polymeric. These unwanted by-products have high boiling points and can easily be separated from the novel ketones of this invention. For example, in Run 4, 9% of the reaction product after 1 hour of irradiation is high boiling by-products, 21% of the reaction product is the mixture of novel ketones and 70% of the reaction product is unreacted 4-caranone.

EXAMPLE IV

Perfume compositions

Perfume compositions are prepared by intermixing the components shown below:

Composition A

| Component: | Percent by wt. |
|---|---|
| Spearmint | 70 |
| 4-caranone | 5 |
| 2,2,5 - trimethyl-3-vinylcyclopentanone | 3 |
| 2-(2' - methyl-2'-but-3'-enyl) - 4 - methylcyclobutanone | 2 |
| Para-menth-3-en-2-one | 5 |
| Spike lavender | 5 |
| Rosemary | 5 |
| Patchouli | 3 |
| Vetivert | 2 |

This perfume composition exhibits a highly desirable and useful minty bouquet odor.

Composition B

| Component: | Percent by wt. |
|---|---|
| Spearmint | 72.5 |
| Para-menth-3-en-2-one | 10.0 |
| Spike lavender | 7.5 |
| Rosemary | 5.0 |
| Patchouli | 3.0 |
| Vetivert bourbon | 2.0 |

This perfume composition exhibits a highly desirable and useful minty bouquet odor.

Composition C

| Component: | Percent by wt. |
|---|---|
| Lavandin | 40 |
| Spike lavender | 20 |
| Rosemary | 20 |
| 4 - caranone | 10 |
| Eucalyptus | 5 |
| Red thyme | 2 |
| Peppermint | 1 |
| Spearmint | 1 |
| Menthol U.S.P. | 1 |

This perfume composition exhibits a highly desirable and useful herbal bouquet odor.

Composition D

| Component: | Percent by wt. |
|---|---|
| Lemon oil | 48 |
| Linalyl acetate | 20 |
| Linalool | 20 |
| 2,2,5-trimethyl-3-vinylcyclopentanone | 6 |
| 2 - (2' - methyl-2'-but-3'-enyl)-4-methylcyclobutanone | 4 |
| Iso cyclo citral | 1 |
| Decylaldehyde | 1 |

This perfume composition exhibits a highly desirable and useful fresh bouquet odor.

2,2,5 - trimethyl - 3 - vinylcyclopentanone, 2-(2'-methyl-2' - but-3'-enyl)-4-methylcyclobutanone, 4-caranone and para-menth-3-en-2-one are useful in various perfume compositions. Thus, the components and proportions in the perfume compositions of this example can be adjusted according to methods well known in the perfume art to form a wide variety of desirable perfume compositions containing odoriferously effective amounts of these compounds.

EXAMPLE V

Detergent compositions

A conventional heavy-duty built detergent having the following composition is prepared.

| Component: | Percent by wt. |
|---|---|
| Sodium dodecyl benzene sulfonate | 20.0 |
| Sodium tripolyphosphate | 50.0 |
| Sodium silicate | 6.0 |
| Sodium sulfate | 14.0 |
| Water | 9.8 |
| Perfume Composition A of Example IV | 0.2 |

This detergent composition exhibits a highly desirable minty bouquet odor. Other perfume compositions, e.g. Compositions B, C and D of Example IV, employing odoriferously effective amounts of the novel cyclopentanone and novel cyclobutanone compounds of this invention, 4-caranone and para-menth-3-en-2-one can be substituted for the perfume composition in the detergent composition of this example according to methods well known in the perfume art.

EXAMPLE VI

Soap bar compositions

A conventional household soap bar having the following composition is prepared.

| Component: | Percent by wt. |
|---|---|
| Sodium soap | 75.0 |
| Potassium soap [1] | 7.5 |
| Water | 15.0 |
| Perfume Composition A of Example IV | 2.5 |

[1] The total soap comprises a mixture of 80% tallow soap and 20% coconut soap.

This soap bar exhibits a highly desirable minty bouquet odor. Other perfum compositions, such as those illustrated in Example IV, employing odoriferously effective amounts of the novel cyclopentanone and/or novel cyclobutanone compounds of this invention, and/or 4-caranone and/or para-menth-3-en-2-one can be substituted for the perfume composition in the soap bar of this example according to methods well known in the art.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. A photochemical process of subjecting 4-caranone having the formula:

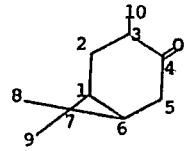

to ultraviolet irradiation of from about 200 m$\mu$ to about 400 m$\mu$ at a temperature of from about −40° C. to about 100° C. to form a mixture of 2-(2'-methyl-2'-but-3'-enyl)-4-methylcyclobutanone having the formula:

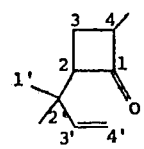

and 2,2,5-trimethyl-3-vinylcyclopentanone having the formula:

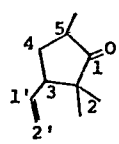

2. The process of claim 1 wherein the wavelengths of irradiation are distributed throughout the range of from about 250 m$\mu$ to about 320 m$\mu$.

3. The photochemical process of claim 1 wherein a solvent is used as an irradiation reaction medium.

4. The photochemical process of claim 3 wherein the concentration of 4-caranone in the irradiation reaction medium ranges from about 0.001 M to about 2 M.

5. The photochemical process of claim 1 which is carried out in an inert atmosphere.
6. 2 - (2'-methyl-2'-but-3'-enyl) - 4 - methylcyclobutanone having the formula:
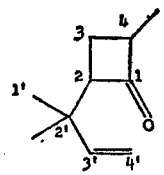
References Cited
Martin et al., "J. Org. Chem.," vol. 30, pp. 4175, 6 and 8 (1965) QD241.J6.
Goldsmith et al., "J. Org. Chem.," vol. 30, pp. 2264 and 5 (1965) QD241.J6.
LEON ZITVER, Primary Examiner
N. P. MORGENSTERN, Assistant Examiner
U.S. Cl. X.R.
204—158; 252—522; 260—348; 348.5, 587